US012559314B2

(12) United States Patent
Fagerland

(10) Patent No.: US 12,559,314 B2
(45) Date of Patent: Feb. 24, 2026

(54) SECTION BASED SPEED REDUCTION

(71) Applicant: Autostore Technology AS, Nedre Vats (NO)

(72) Inventor: Ingvar Fagerland, Kolnes (NO)

(73) Assignee: AutoStore Technology AS, Nedre Vats (NO)

( * ) Notice: Subject to any disclaimer, the term of this patent is extended or adjusted under 35 U.S.C. 154(b) by 631 days.

(21) Appl. No.: 17/907,636

(22) PCT Filed: Mar. 23, 2021

(86) PCT No.: PCT/EP2021/057385
§ 371 (c)(1),
(2) Date: Sep. 28, 2022

(87) PCT Pub. No.: WO2021/197914
PCT Pub. Date: Oct. 7, 2021

(65) Prior Publication Data
US 2023/0136087 A1     May 4, 2023

(30) Foreign Application Priority Data
Mar. 31, 2020    (NO) .................................... 20200387

(51) Int. Cl.
*B65G 1/06*          (2006.01)
*B65G 1/04*          (2006.01)
(Continued)

(52) U.S. Cl.
CPC ........... *B65G 1/065* (2013.01); *B65G 1/0464* (2013.01); *B65G 1/0478* (2013.01); *B65G 1/137* (2013.01);
(Continued)

(58) Field of Classification Search
CPC .... B65G 1/065; B65G 1/0464; B65G 1/0478; B65G 1/137; B65G 1/1378;
(Continued)

(56) References Cited

U.S. PATENT DOCUMENTS 4,766,547 A      8/1988  Modery et al.
10,241,515 B2 *  3/2019  Gariepy ............... G05D 1/0212
(Continued)

FOREIGN PATENT DOCUMENTS

CN       101443220 A    5/2009
CN       101541648 A    9/2009
(Continued)

OTHER PUBLICATIONS

Wacharakorn Saroj, Office Action for Thailand Patent Application No. 2201006347, dated Jul. 15, 2024, 9 pages, pub. by Thailand Patent Office, Nonthaburi, Thailand.
(Continued)

*Primary Examiner* — Thomas Randazzo
(74) *Attorney, Agent, or Firm* — Baker Botts L.L.P.

(57) ABSTRACT

Movement is controlled of a plurality of container handling vehicles on a rail system arranged at least partially across a top of a framework structure of an automated storage and retrieval system, on which rail system the plurality of container handling vehicles are operable to raise storage containers from, and lower storage containers into, storage columns arranged in rows between upright members and horizontal members of the framework structure. The storage containers are also transported above the storage columns. The movement control is performed by a central operational controller which is in communication with a local controller in each container handling vehicle. The central operational controller receives data relating to a subsection of the rail system. The data includes a container handling vehicle
(Continued)

movement threshold for the subsection. The central operational controller instructs a container handling vehicle to follow a path which takes in at least a part of the subsection. The central operational controller instructs the container handling vehicle to reduce speed and/or acceleration such that the movement of the container handling vehicle within the subsection is below the container handling vehicle movement threshold of the sub section.

35 Claims, 5 Drawing Sheets

(51) Int. Cl.

| | |
|---|---|
| *B65G 1/137* | (2006.01) |
| *G05B 19/418* | (2006.01) |
| *G05D 1/00* | (2024.01) |

(52) U.S. Cl.
CPC ..... *G05B 19/41895* (2013.01); *G05D 1/0223* (2013.01); *B65G 1/1378* (2013.01); *B65G 2203/0291* (2013.01)

(58) Field of Classification Search
CPC ........ B65G 2203/0291; B65G 2203/04; B65G 2201/0235; G05D 1/0223; G05B 19/41895
See application file for complete search history.

(56) References Cited

U.S. PATENT DOCUMENTS

| | | |
|---|---|---|
| 2016/0349749 A1 | 12/2016 | Gariepy et al. |
| 2017/0144307 A1 | 5/2017 | Rublee et al. |
| 2018/0282075 A1 | 10/2018 | Allen et al. |
| 2020/0050155 A1 | 2/2020 | Ueba |

FOREIGN PATENT DOCUMENTS

| | | | | |
|---|---|---|---|---|
| CN | 109885070 A | 6/2019 | | |
| EP | 3418222 A1 | 12/2018 | | |
| JP | H05286527 A | 11/1993 | | |
| JP | WO-2021010035 A1 * | 1/2021 | ............ | G05D 1/693 |
| KR | 1020160040690 A | 4/2016 | | |
| WO | 317366 B1 | 10/2004 | | |
| WO | 2014075937 A1 | 5/2014 | | |
| WO | 2014090684 A1 | 6/2014 | | |
| WO | 2015019055 A1 | 2/2015 | | |
| WO | 2015185628 A2 | 12/2015 | | |
| WO | 2015193278 A1 | 12/2015 | | |
| WO | 2018146304 A1 | 8/2018 | | |
| WO | 2018146687 A1 | 8/2018 | | |
| WO | 2019087618 A1 | 5/2019 | | |
| WO | 2019138392 A1 | 7/2019 | | |

OTHER PUBLICATIONS

International Search Report issued in International Application No. PCT/EP2021/057385, mailed Jun. 30, 2021 (5 pages).
Written Opinion issued in International Application No. PCT/EP2021/057385; Dated Jun. 30, 2021 (9 pages).
International Preliminary Report on Patentability issued in International Application No. PCT/EP2021/057385; mailed Jul. 4, 2022 (10 pages).
Search Report issued in Norwegian Application No. 20200387; Dated Oct. 29, 2020 (2 pages).
Le Huy Anh, Examination Report Notice for Vietnamese Patent Application No. 1-2022-06743, dated Mar. 28, 2025, 4 pages, pub. by the Intellectual Property Office of Vietnam, Hanoi, Vietnam.
Thibaut, Charles, Office Action for European Patent Application No. 21715798.1, dated Nov. 6, 2024, 5 pages, pub. by the EPO, Rijswijk, Netherlands.
Xu Yong, First Office Action for Chinese Patent Application No. 202180038990.6, dated Jan. 22, 2025, 24 pages, pub. by SIPO, Beijing, China.
Thibaut, Charles, Extended European Search Report in EP25164252.6, mailed May 30, 2025, 16 pages, European Patent Office, Munich, Germany.
Xu, Yong, Office Action in CN202180038990.6, mailed Jul. 30, 2025, 20 pages, the State Intellectual Property Office of the People's Republic of China, Beijing, China.
Anonymous, Office Action in KR1020227037556, mailed Nov. 14, 2025, 21 pages, Korean Intellectual Property Office, Daejeon, Korea.
Xu, Yong, Office Action in CN202180038990.6, mailed Nov. 27, 2025, 26 pages, The State Intellectual Property Office of the People's Republic of China, Beijing, China.
Binti Aziz, Azyani, Office Action in MYPI2022005395, mailed Jan. 13, 2026, 4 pages, Intellectual Property Corporation of Malaysia, Malaysia.

* cited by examiner

201a

201

Y

X

Z

201c

201b

301

301a

304

Y

X

Z

301c

301b

SECTION BASED SPEED REDUCTION

FIELD OF THE INVENTION

The present invention relates to an automated storage and retrieval system for storage and retrieval of containers, in particular to a system and a method for controlling movement of a plurality of container handling vehicles on a rail system to reduce speed and/or acceleration such that the movement of the container handling vehicle within a subsection of the rail system is below the container handling vehicle movement threshold of the subsection.

BACKGROUND AND PRIOR ART

FIG. 1 discloses a typical prior art automated storage and retrieval system 1 with a framework structure 100 and FIGS. 2 and 3 disclose two different prior art container handling vehicles 201,301 suitable for operating on such a system 1.

The framework structure 100 comprises upright members 102, horizontal members 103 and a storage volume comprising storage columns 105 arranged in rows between the upright members 102 and the horizontal members 103. In these storage columns 105 storage containers 106, also known as bins, are stacked one on top of one another to form stacks 107. The members 102, 103 may typically be made of metal, e.g. extruded aluminum profiles.

The framework structure 100 of the automated storage and retrieval system 1 comprises a rail system 108 arranged across the top of framework structure 100, on which rail system 108 a plurality of container handling vehicles 201, 301 are operated to raise storage containers 106 from, and lower storage containers 106 into, the storage columns 105, and also to transport the storage containers 106 above the storage columns 105. The rail system 108 comprises a first set of parallel rails 110 arranged to guide movement of the container handling vehicles 201,301 in a first direction X across the top of the frame structure 100, and a second set of parallel rails 111 arranged perpendicular to the first set of rails 110 to guide movement of the container handling vehicles 201,301 in a second direction Y which is perpendicular to the first direction X. Containers 106 stored in the columns 105 are accessed by the container handling vehicles through access openings 112 in the rail system 108. The container handling vehicles 201,301 can move laterally above the storage columns 105, i.e. in a plane which is parallel to the horizontal X-Y plane.

The upright members 102 of the framework structure 100 may be used to guide the storage containers during raising of the containers out from and lowering of the containers into the columns 105. The stacks 107 of containers 106 are typically self-supportive.

Each prior art container handling vehicle 201,301 comprises a vehicle body 201a,301a, and first and second sets of wheels 201b,301b,201c,301c which enable the lateral movement of the container handling vehicles 201,301 in the X direction and in the Y direction, respectively. In FIGS. 2 and 3 two wheels in each set are fully visible. The first set of wheels 201b,301b is arranged to engage with two adjacent rails of the first set 110 of rails, and the second set of wheels 201c,301c is arranged to engage with two adjacent rails of the second set 111 of rails. At least one of the sets of wheels 201b,301b,201c,301c can be lifted and lowered, so that the first set of wheels 201b,301b and/or the second set of wheels 201c,301c can be engaged with the respective set of rails 110, 111 at any one time.

Each prior art container handling vehicle 201,301 also comprises a lifting device (not shown) for vertical transportation of storage containers 106, e.g. raising a storage container 106 from, and lowering a storage container 106 into, a storage column 105. The lifting device comprises one or more gripping/engaging devices which are adapted to engage a storage container 106, and which gripping/engaging devices can be lowered from the vehicle 201,301 so that the position of the gripping/engaging devices with respect to the vehicle 201,301 can be adjusted in a third direction Z which is orthogonal the first direction X and the second direction Y. Parts of the gripping device of the container handling vehicle 301 are shown in FIG. 3 indicated with reference number 304. The gripping device of the container handling device 201 is located within the vehicle body 301a in FIG. 2.

Conventionally, and also for the purpose of this application, Z=1 identifies the uppermost layer of storage containers, i.e. the layer immediately below the rail system 108, Z=2 the second layer below the rail system 108, Z=3 the third layer etc. In the exemplary prior art disclosed in FIG. 1, Z=8 identifies the lowermost, bottom layer of storage containers. Similarly, X=1 . . . n and Y=1 . . . n identifies the position of each storage column 105 in the horizontal plane. Consequently, as an example, and using the Cartesian coordinate system X, Y, Z indicated in FIG. 1, the storage container identified as 106' in FIG. 1 can be said to occupy storage position X=10, Y=2, Z=3. The container handling vehicles 201,301 can be said to travel in layer Z=0, and each storage column 105 can be identified by its X and Y coordinates.

The storage volume of the framework structure 100 has often been referred to as a grid 104, where the possible storage positions within this grid are referred to as storage cells. Each storage column may be identified by a position in an X- and Y-direction, while each storage cell may be identified by a container number in the X-, Y and Z-direction.

Each prior art container handling vehicle 201,301 comprises a storage compartment or space for receiving and stowing a storage container 106 when transporting the storage container 106 across the rail system 108. The storage space may comprise a cavity arranged centrally within the vehicle body 201a as shown in FIG. 2 and as described in e.g. WO2015193278A1, the contents of which are incorporated herein by reference.

FIG. 3 shows an alternative configuration of a container handling vehicle 301 with a cantilever construction. Such a vehicle is described in detail in e.g. NO317366, the contents of which are also incorporated herein by reference.

The central cavity container handling vehicles 201 shown in FIG. 2 may have a footprint that covers an area with dimensions in the X and Y directions which is generally equal to the lateral extent of a storage column 105, e.g. as is described in WO2015193278A1, the contents of which are incorporated herein by reference. The term 'lateral' used herein may mean 'horizontal'.

Alternatively, the central cavity container handling vehicles 101 may have a footprint which is larger than the lateral area defined by a storage column 105, e.g. as is disclosed in WO2014090684A1.

The rail system 108 typically comprises rails with grooves in which the wheels of the vehicles run. Alternatively, the rails may comprise upwardly protruding elements, where the wheels of the vehicles comprise flanges to prevent derailing. These grooves and upwardly protruding elements are collectively known as tracks. Each rail may comprise one track, or each rail may comprise two parallel tracks.

WO2018146304, the contents of which are incorporated herein by reference, illustrates a typical configuration of rail system 108 comprising rails and parallel tracks in both X and Y directions.

In the framework structure 100, a majority of the columns 105 are storage columns 105, i.e. columns 105 where storage containers 106 are stored in stacks 107. However, some columns 105 may have other purposes. In FIG. 1, columns 119 and 120 are such special-purpose columns used by the container handling vehicles 201,301 to drop off and/or pick up storage containers 106 so that they can be transported to an access station (not shown) where the storage containers 106 can be accessed from outside of the framework structure 100 or transferred out of or into the framework structure 100. Within the art, such a location is normally referred to as a 'port' and the column in which the port is located may be referred to as a 'port column' 119,120. The transportation to the access station may be in any direction, that is horizontal, tilted and/or vertical. For example, the storage containers 106 may be placed in a random or dedicated column 105 within the framework structure 100, then picked up by any container handling vehicle and transported to a port column 119,120 for further transportation to an access station. Note that the term 'tilted' means transportation of storage containers 106 having a general transportation orientation somewhere between horizontal and vertical.

In FIG. 1, the first port column 119 may for example be a dedicated drop-off port column where the container handling vehicles 201,301 can drop off storage containers 106 to be transported to an access or a transfer station, and the second port column 120 may be a dedicated pick-up port column where the container handling vehicles 201,301 can pick up storage containers 106 that have been transported from an access or a transfer station.

The access station may typically be a picking or a stocking station where product items are removed from or positioned into the storage containers 106. In a picking or a stocking station, the storage containers 106 are normally not removed from the automated storage and retrieval system 1, but are returned into the framework structure 100 again once accessed. A port can also be used for transferring storage containers to another storage facility (e.g. to another framework structure or to another automated storage and retrieval system), to a transport vehicle (e.g. a train or a lorry), or to a production facility.

A conveyor system comprising conveyors is normally employed to transport the storage containers between the port columns 119,120 and the access station.

If the port columns 119,120 and the access station are located at different levels, the conveyor system may comprise a lift device with a vertical component for transporting the storage containers 106 vertically between the port column 119,120 and the access station.

The conveyor system may be arranged to transfer storage containers 106 between different framework structures, e.g. as is described in WO2014075937A1, the contents of which are incorporated herein by reference.

When a storage container 106 stored in one of the columns 105 disclosed in FIG. 1 is to be accessed, one of the container handling vehicles 201,301 is instructed to retrieve the target storage container 106 from its position and transport it to the drop-off port column 119. This operation involves moving the container handling vehicle 201,301 to a location above the storage column 105 in which the target storage container 106 is positioned, retrieving the storage container 106 from the storage column 105 using the container handling vehicle's 201,301 lifting device (not shown), and transporting the storage container 106 to the drop-off port column 119. If the target storage container 106 is located deep within a stack 107, i.e. with one or a plurality of other storage containers 106 positioned above the target storage container 106, the operation also involves temporarily moving the above-positioned storage containers prior to lifting the target storage container 106 from the storage column 105. This step, which is sometimes referred to as "digging" within the art, may be performed with the same container handling vehicle that is subsequently used for transporting the target storage container to the drop-off port column 119, or with one or a plurality of other cooperating container handling vehicles. Alternatively, or in addition, the automated storage and retrieval system 1 may have container handling vehicles specifically dedicated to the task of temporarily removing storage containers from a storage column 105. Once the target storage container 106 has been removed from the storage column 105, the temporarily removed storage containers can be repositioned into the original storage column 105. However, the removed storage containers may alternatively be relocated to other storage columns.

When a storage container 106 is to be stored in one of the columns 105, one of the container handling vehicles 201,301 is instructed to pick up the storage container 106 from the pick-up port column 120 and transport it to a location above the storage column 105 where it is to be stored. After any storage containers positioned at or above the target position within the storage column stack 107 have been removed, the container handling vehicle 201,301 positions the storage container 106 at the desired position. The removed storage containers may then be lowered back into the storage column 105, or relocated to other storage columns.

For monitoring and controlling the automated storage and retrieval system 1, e.g. monitoring and controlling the location of respective storage containers 106 within the framework structure 100, the content of each storage container 106; and the movement of the container handling vehicles 201,301 so that a desired storage container 106 can be delivered to the desired location at the desired time without the container handling vehicles 201,301 colliding with each other, the automated storage and retrieval system 1 comprises a control system 500 which typically is computerized and which typically comprises a database for keeping track of the storage containers 106.

WO2018146687 describes a system for controlling movement of plurality of container handling vehicles where the container handling vehicles transport storage containers, store and retrieve storage containers into/from storage columns.

The framework structure 100 and the rail system 108 is specified and constructed to allow operation of the plurality of container handling vehicles 201, 301 at full speed and acceleration. However, after installation or during operation it may be determined that some areas of the framework structure 100 and/or the rail system 108 are outside specifications. This may lead to operational errors of the container handling vehicles 201, 301. The operational errors may lead to system stop or crash of container handling vehicles 201, 301. In order to be safe and avoid the operation errors, the speed and/or acceleration is reduced for all container handling vehicles 201, 301 on the rail system 108. This leads to a considerably reduced capacity of the automated storage and retrieval system 1.

In WO2019138392 an access control method is utilized in order to guarantee the structural integrity of a grid-like storage facility. The access control method limits the number of transporting devices in a constraint area by granting or withholding clearance to each transporting device to traverse the constraint area. It does not address operational errors of the transporting vehicles.

In view of the problems, the present invention aims to provide a system and method for the automated storage and retrieval system which avoids operational errors of the container handling vehicles in out of specification areas without significantly reducing the capacity of the automated storage and retrieval system.

SUMMARY OF THE INVENTION

The present invention is set forth and characterized in the independent claims, while the dependent claims describe other characteristics of the invention.

In one aspect, the invention is related to a method for controlling movement of a plurality of container handling vehicles on a rail system arranged at least partially across a top of framework structure of an automated storage and retrieval system, on which rail system the plurality of container handling vehicles are operable to raise storage containers from, and lower storage containers into, storage columns arranged in rows between upright members and horizontal members of the framework structure, and also to transport the storage containers above the storage columns. The following steps are performed by a central operational controller which is in communication with a local controller in each container handling vehicle. Receiving data relating to a subsection of the rail system, the data comprising a container handling vehicle movement threshold for the subsection. Instructing a container handling vehicle to follow a path which takes in at least a part of the subsection. Instructing the container handling vehicle to reduce speed and/or acceleration such that the movement of the container handling vehicle within the is below the container handling vehicle movement threshold of the subsection. Driving the container handling vehicle at slower speed/acceleration allows the control system to better handle operational errors. In this way, system stops or crashes can be avoided.

In an embodiment, the method may further comprise, prior to the step of instructing the container handling vehicle to reduce speed and/or acceleration, a step of determining that a current movement of the container handling vehicle exceeds the container handling vehicle movement threshold of the subsection. The central operation controller may then only instruct to reduce speed and/or acceleration when the current movement of the container handling vehicle exceeds the container handling vehicle movement threshold of the subsection. The number of instructions over the communication channel is therefore reduced and unwanted additional load on the communication channels is avoided.

In an embodiment, determining that the container handling vehicle exceeds the container handling vehicle movement threshold may further comprise classifying the container handling vehicle according to a container handling vehicle classification, and determining, based on the container handling vehicle classification, that the container handling vehicle exceeds the container handling vehicle movement threshold. The container handling vehicle classification comprises a default speed and/or acceleration of the container handling vehicle.

In an embodiment, determining that the container handling vehicle exceeds the container handling vehicle movement threshold may further comprise receiving data of the weight of a storage container transported by the container handling vehicle, and determining, based on the weight of the storage container and the container handling classification, that the container handling vehicle exceeds the container handling vehicle movement threshold.

In an embodiment, determining that the container handling vehicle exceeds the container handling vehicle movement threshold may further comprise receiving historical movement data of the container handling vehicle, and determining, based on the historical movement data of the container handling vehicle, that the container handling vehicle exceeds the container handling vehicle movement threshold.

In an embodiment, the method may further comprise instructing the container handling vehicle to revert to a default speed and/or acceleration when the container handling vehicle is leaving and/or about to leave the subsection.

In an embodiment, the container handling vehicle movement threshold sets a maximum speed of the container handling vehicle.

In an embodiment, the container handling vehicle movement threshold sets a maximum acceleration of the container handling vehicle.

In an embodiment, the container handling vehicle movement threshold sets a maximum linear momentum of the container handling vehicle.

In an embodiment, the method may further comprise determining, using a rail inspection vehicle traversing the rail system, the container handling vehicle movement threshold for the subsection of the rail system. The container handling vehicle movement threshold may be determined based on detected vertical and/or horizontal movement of the rail inspection vehicle due to movement in the rail system above a fault threshold. The container handling vehicle movement threshold may be determined based on detected changes in horizontal movement of the rail inspection vehicle due to a change in a condition of the rail system. The container handling vehicle movement threshold may also be determined based on visually detected faults in the rail system using the rail inspection vehicle or other method.

In an embodiment, the method may further comprise determining the container handling vehicle movement threshold for the subsection based on a reduced mechanical stability in the subsection of the of rail system compared to a mechanical stability of the rail system outside the subsection.

In an embodiment, the method may further comprise determining the container handling vehicle movement threshold for the subsection based on a displacement of the of rail system in the subsection in relation to the rail system outside the subsection.

In an embodiment, the method may further comprise determining the container handling vehicle movement threshold for the subsection based on a reduced friction in the subsection of the rail system compared to a friction of the rail system outside the subsection.

In an embodiment, the method may further comprise determining the container handling vehicle movement threshold for the subsection based on different environmental conditions in the subsection of the rail system than in the rail system outside the subsection.

In an embodiment, the method may further comprise transmitting the container handling vehicle movement threshold for the subsection to the local controller in the container handling vehicle, and performing, using the local controller in the container handling vehicle, the step of instructing the container handling vehicle to reduce speed and/or acceleration such that the movement of the container handling vehicle within the subsection is below the container handling vehicle movement threshold of the subsection.

In a second aspect, the invention concerns a system comprising a rail system arranged at least partially across a top of framework structure of an automated storage and retrieval system, a plurality of container handling vehicles operating on the rail system to raise storage containers from, and lower storage containers into, storage columns arranged in rows between upright members and horizontal members of the framework structure, and also to transport the storage containers above the storage columns, each container handling vehicle comprising a local controller adapted to control movements of the container handling vehicle, and a central operational controller in communication with the local controller in each container handling vehicle. The central operational controller is adapted to perform receiving data relating to a subsection of the rail system, the data comprising a container handling vehicle movement threshold for the subsection, instructing a container handling vehicle to follow a path which takes in at least a part of the subsection, and instructing the container handling vehicle to reduce speed and/or acceleration such that the movement of the container handling vehicle within the subsection is below the container handling vehicle movement threshold of the subsection. Driving the container handling vehicle at slower speed/acceleration allows the control system to better handle operational errors. In this way, system stops or crashes can be avoided.

In an embodiment of the system, the central operational controller may be further adapted to, prior to instructing the container handling vehicle to reduce speed and/or acceleration, determining that a current movement of the container handling vehicle exceeds the container handling vehicle movement threshold of the subsection. The central operation controller may then only instruct to reduce speed and/or acceleration when the current movement of the container handling vehicle exceeds the container handling vehicle movement threshold of the subsection. The number of instructions over the communication channel is therefore reduced and unwanted additional load on the communication channels is avoided.

In an embodiment of the system, determining that the container handling vehicle exceeds the container handling vehicle movement threshold may further comprise classifying the container handling vehicle according to a container handling vehicle classification, and determining, based on the container handling vehicle classification, that the container handling vehicle exceeds the container handling vehicle movement threshold. The container handling vehicle classification comprises a default speed and/or acceleration of the container handling vehicle.

In an embodiment of the system, determining that the container handling vehicle exceeds the container handling vehicle movement threshold may further comprise receiving data of the weight of a storage container transported by the container handling vehicle, and determining, based on the weight of the storage container and the container handling classification, that the container handling vehicle exceeds the container handling vehicle movement threshold.

In an embodiment of the system, determining that the container handling vehicle exceeds the container handling vehicle movement threshold may further comprise receiving historical movement data of the container handling vehicle, and determining, based on the historical movement data of the container handling vehicle, that the container handling vehicle exceeds the container handling vehicle movement threshold.

In an embodiment of the system, the central operational controller may be further adapted to instructing the container handling vehicle to revert to a default speed and/or acceleration when the container handling vehicle is leaving and/or about to leave the subsection.

In an embodiment of the system, the container handling vehicle movement threshold sets a maximum speed of the container handling vehicle.

In an embodiment of the system, the container handling vehicle movement threshold sets a maximum acceleration of the container handling vehicle.

In an embodiment of the system, the container handling vehicle movement threshold sets a maximum linear momentum of the container handling vehicle.

In an embodiment of the system, the system may further comprise a rail inspection vehicle adapted to traverse the rail system, and is adapted to determining, using the rail inspection vehicle, the container handling vehicle movement threshold for the subsection of the rail system. The container handling vehicle movement threshold may be determined based on detected vertical and/or horizontal movement of the rail inspection vehicle due to movement in the rail system above a fault threshold. The container handling vehicle movement threshold may be determined based on detected changes in horizontal movement of the rail inspection vehicle due to a change in a condition of the rail system. The container handling vehicle movement threshold may also be determined based on visually detected faults in the rail system using the rail inspection vehicle or other method.

In an embodiment of the system, the container handling vehicle movement threshold for the subsection may be determined based on a reduced mechanical stability in the subsection of the of rail system compared to a mechanical stability of the rail system outside the subsection.

In an embodiment of the system, the container handling vehicle movement threshold for the subsection may be determined based on a displacement of the of rail system in the subsection in relation to the rail system outside the subsection.

In an embodiment of the system, the container handling vehicle movement threshold for the subsection may be determined based on a reduced friction in the subsection of the rail system compared to a friction of the rail system outside the subsection.

In an embodiment of the system, the container handling vehicle movement threshold for the subsection may be determined based on different environmental conditions in the subsection of the rail system than in the rail system outside the subsection.

In an embodiment of the system, the central operational controller may be further adapted to transmitting the container handling vehicle movement threshold for the subsection to the local controller in the container handling vehicle, and the local controller in the container handling vehicle may be further adapted to instructing the container handling vehicle to reduce speed and/or acceleration such that the movement of the container handling vehicle within the subsection is below the container handling vehicle movement threshold of the subsection.

In a third aspect the invention is directed to a computer program product for a central operational controller in a system comprising a plurality of container handling vehicles on a rail system arranged at least partially across a top of framework structure of an automated storage and retrieval system, on which rail system the plurality of container handling vehicles are operable to raise storage containers from, and lower storage containers into, storage columns arranged in rows between upright members and horizontal members of the framework structure, and also to transport the storage containers above the storage columns, each container handling vehicle comprising a local controller adapted to control movements of the container handling vehicle, and the central operational controller is in communication with the local controller in each container handling vehicle, the computer program product comprises instructions that when executed on the central operational controller performs the method according to the first aspect of the invention.

BRIEF DESCRIPTION OF THE DRAWINGS

Following drawings are appended to facilitate the understanding of the invention. The drawings show embodiments of the invention, which will now be described by way of example only, where.

DETAILED DESCRIPTION OF THE INVENTION

Figure 1:
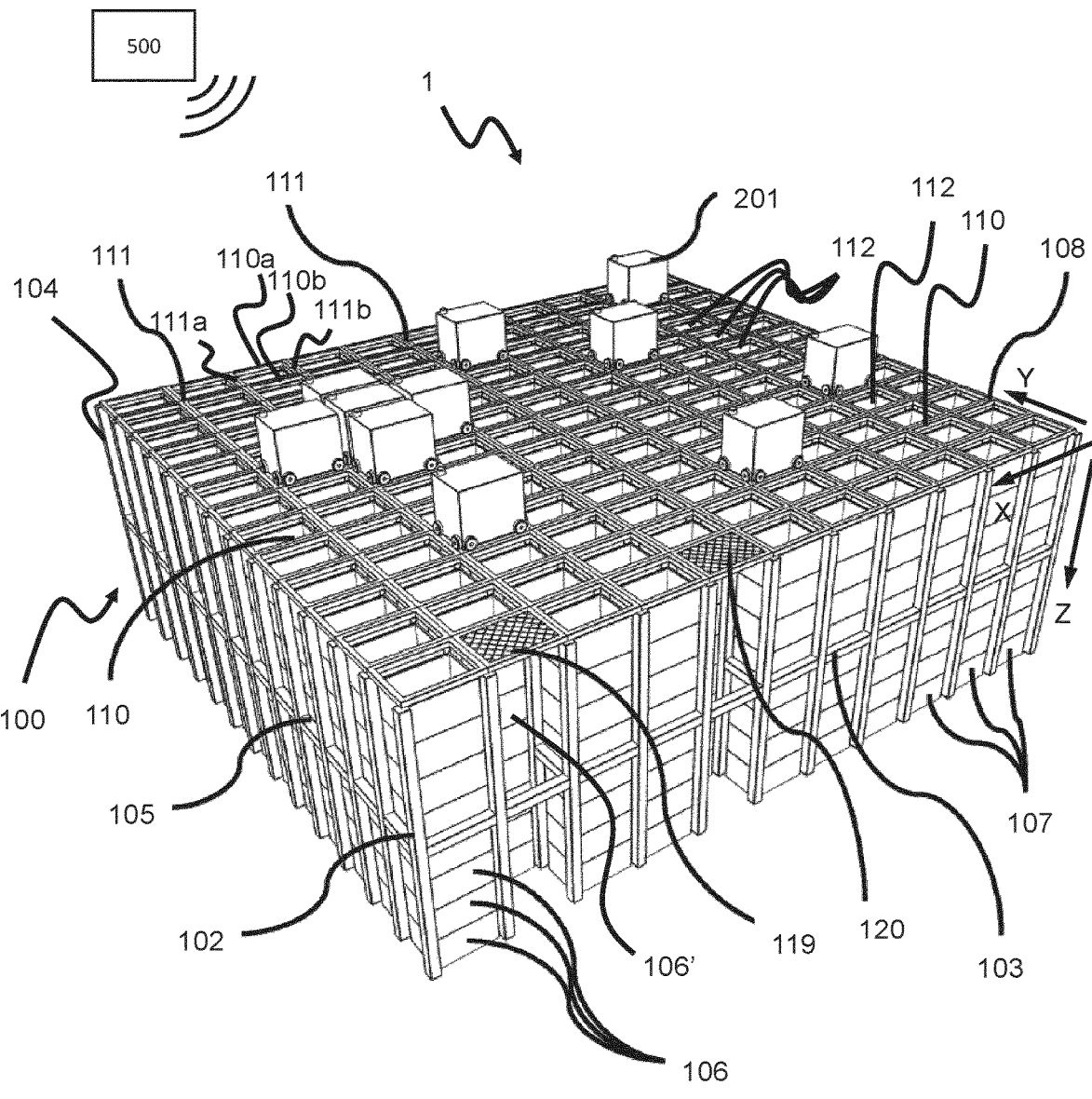
FIG. 1 is a perspective view of a framework structure of a prior art automated storage and retrieval system.

In the following, embodiments of the invention will be discussed in more detail with reference to the appended drawings. It should be understood, however, that the drawings are not intended to limit the invention to the subject-matter depicted in the drawings.

Figure 2:
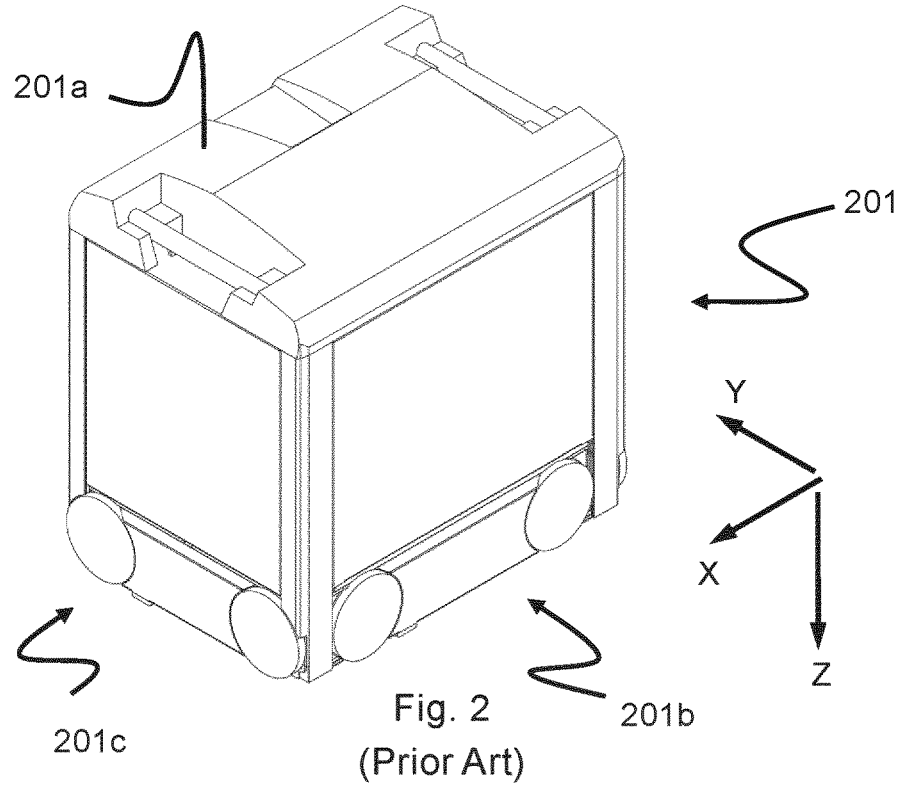
FIG. 2 is a perspective view of a prior art container handling vehicle having a centrally arranged cavity for carrying storage containers therein.
Figure 3:
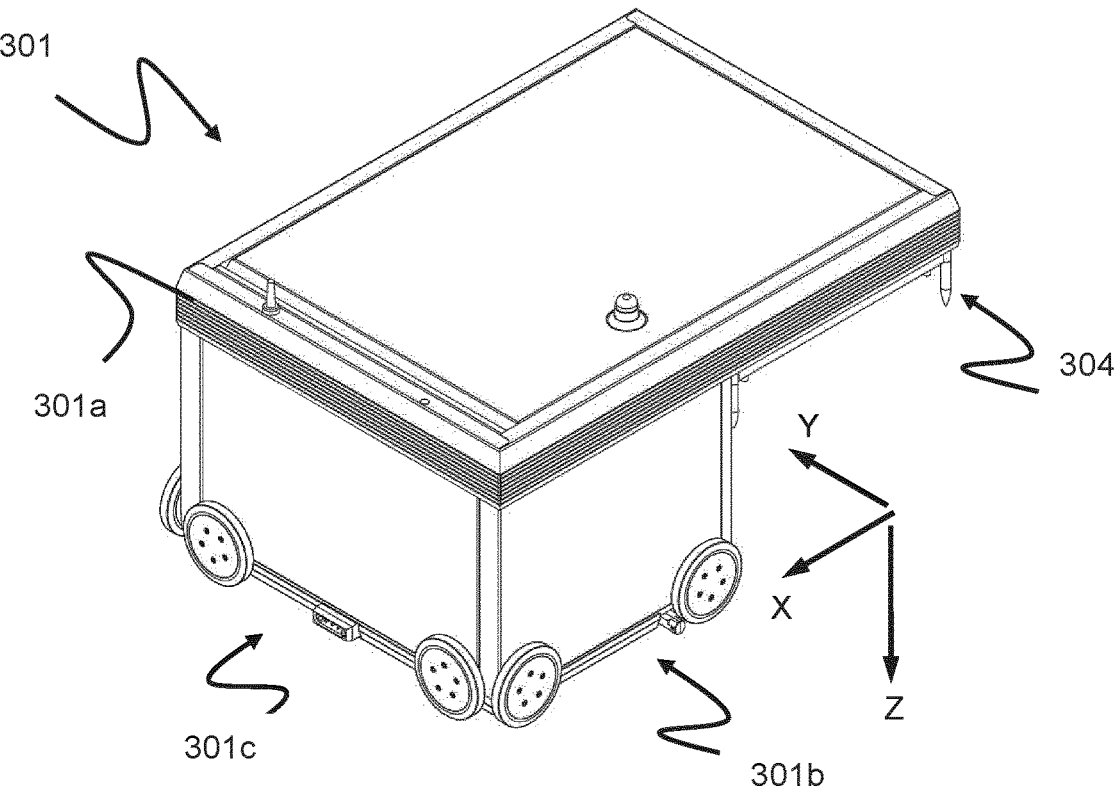
FIG. 3 is a perspective view of a prior art container handling vehicle having a cantilever for carrying storage containers underneath.

The framework structure 100 of the automated storage and retrieval system 1 is constructed in accordance with the prior art framework structure 100 described above in connection with FIGS. 1-3, i.e. a number of upright members 102 and a number of horizontal members 103, which are supported by the upright members 102, and further that the framework structure 100 comprises a first, upper rail system 108 in the X direction and Y direction.

The framework structure 100 further comprises storage compartments in the form of storage columns 105 provided between the members 102, 103, where storage containers 106 are stackable in stacks 107 within the storage columns 105.

The framework structure 100 can be of any size. In particular it is understood that the framework structure can be considerably wider and/or longer and/or deeper than disclosed in FIG. 1. For example, the framework structure 100 may have a horizontal extent of more than 700×700 columns and a storage depth of more than twelve containers.

One embodiment of the automated storage and retrieval system according to the invention will now be discussed in more detail with reference to FIGS. 4, 5 and 6.

Figure 4:
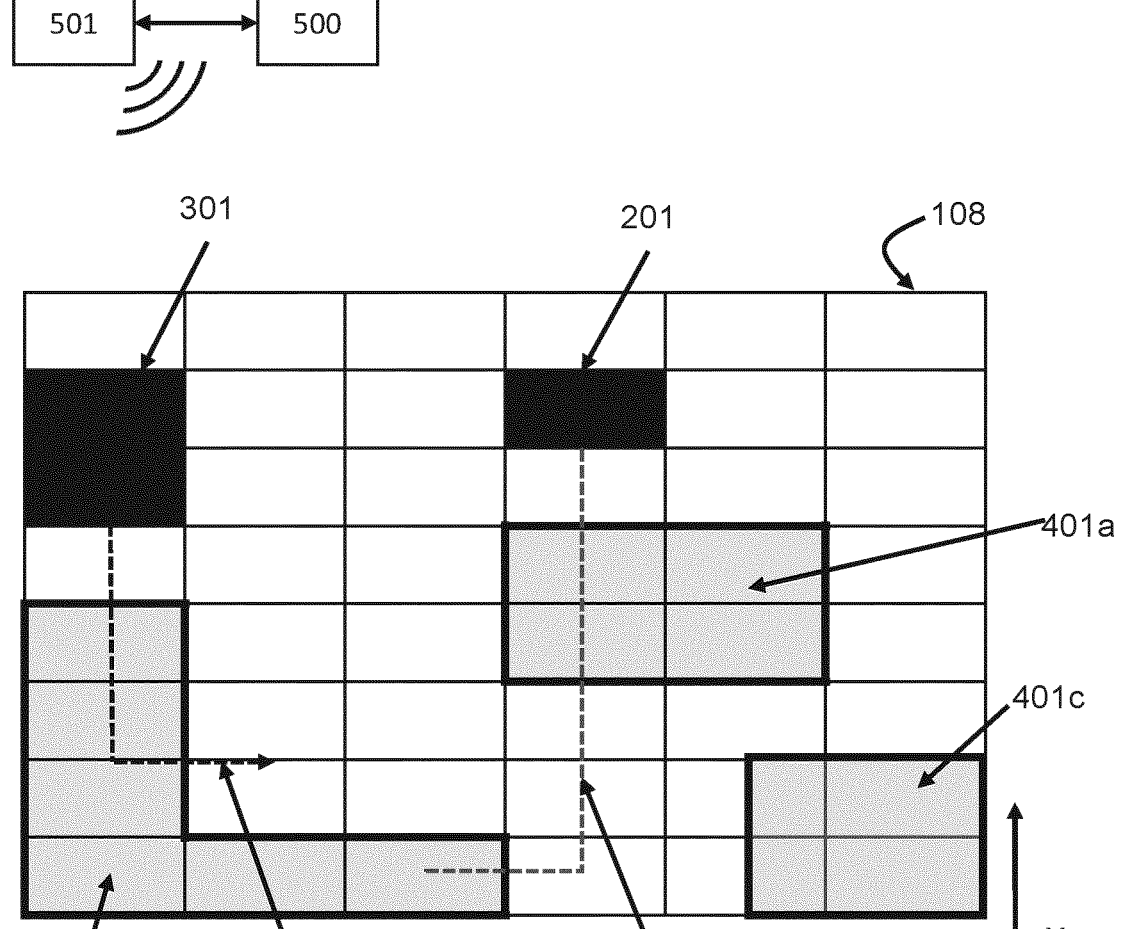
FIG. 4 is a schematic overview of exemplary subsections according to the present invention.

FIG. 4 is a schematic overview of a part of the rail system 108, where it is shown container handling vehicles 201, 301 instructed to follow paths 402, 403, respectively, taking in at least a part of two subsections 401a, 401b. The two subsections 401a, 401b are for simplicity defined in terms of integer units of storage columns but may also be defined by fractional units of storage columns, or by other suitable coordinates. An exemplary third subsection 401c is defined by one and a half storage column in the Y-direction two storage columns in the X-direction. The subsections 401a, 401b, 401c are areas of the rail system 108 where there is a higher likelihood for operational errors of the container handling vehicles 201, 301 compared to the remaining areas of the rail system 108. Operational errors may include that the container handling vehicles 201, 301 are incapable of stopping in the correct position, or the container handling vehicles 201, 301 detects that sensor data does not correlate with expected data. The operation errors may lead to a system stop, or worse, a crash between container handling vehicles.

Driving the container handling vehicle 201, 301 at slower speed/acceleration allows the control system 500 to better handle operational errors, in this way, system stops or crashes can be avoided.

Each container handling vehicle 201, 301 comprises a local controller adapted to control movements of the container handling vehicle 201, 301. Controlling the movements of the container handling vehicle 201, 301 includes controlling electric motors driving the driving means, such as wheels, of the container handling vehicle. The container handling vehicle 201, 301 usually run at full speed and acceleration. The full speed and acceleration of the container handling vehicle 201, 301 is defined by the construction of the electric motors driving the driving means of the container handling vehicle. Depending on the type of the electric motor, the speed and acceleration of the electric motor may be controlled by adjusting frequency and or voltage of the power supplied to the electric motor. In real life electric motors, while being manufactured to a certain specification, there will be deviations from the specification in manufacture, thus different electric motors supplied with identical power may move at different speeds. The actual speed of the container handling vehicle 201, 301 may vary within the deviations from the specifications. Hence, the speed and acceleration of the container handling vehicle 201, 301 referred herein is not the true speed and acceleration of the container handling vehicle 201, 301, rather it is the speed and acceleration obtained by each the container handling vehicle 201, 301 at a given power supplied to the electric motors. Furthermore, a reduced speed and acceleration is obtained by supplying the electric motors of the container handling vehicles 201, 301 with a fraction of the power supplied to the motors at full speed and acceleration. The term acceleration should be seen to also include negative acceleration, e.g. deceleration.

The system is provided with a central operational controller 501 in communication with the local controller in each container handling vehicle 201, 301. The communication between the local controller and the central operational controller may be any suitable wired or wireless communication technology. The central operational controller 501 is also in communication with the control system 500 using any suitable wired or wireless communication technology.

Figure 5:
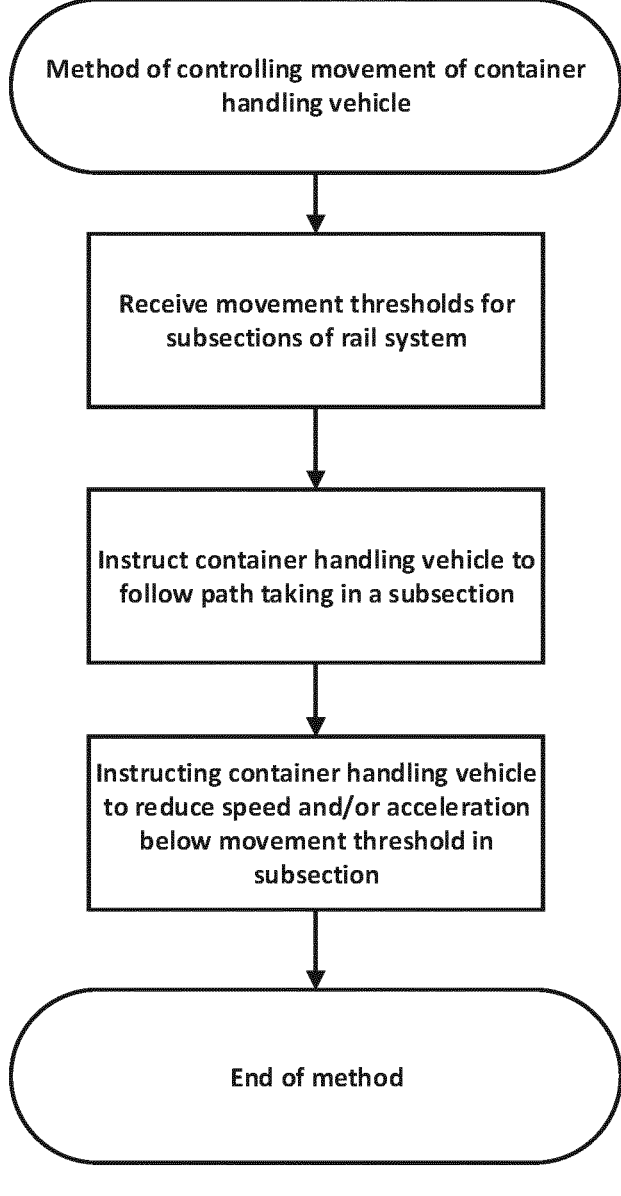
FIG. 5 is an exemplary flowchart of a method according to the present invention
Figure 6:
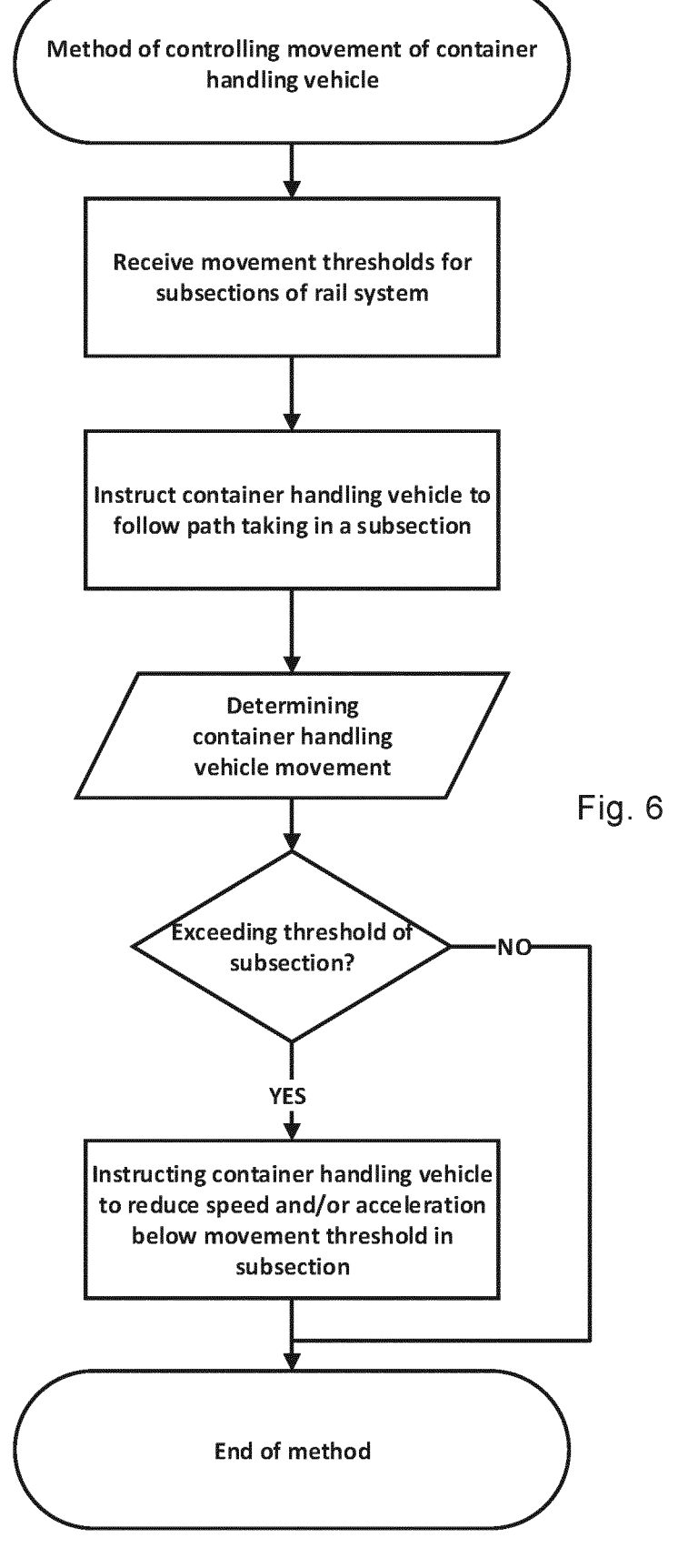
FIG. 6 is another exemplary flowchart of a method according to the present invention.

With additional reference to FIG. 5 illustrating a method of controlling movement of the container handling vehicle 201, 301. The central operational controller 501 receives data relating to a subsection 401a, 401b of the rail system 108, the data comprises a container handling vehicle movement threshold for the subsection 401a, 401b. The central operation controller 501 may receive the container handling vehicle movement threshold from the control system 500. The container handling vehicle movement threshold may set at least one of a maximum speed of the container handling vehicle 201, 301, a maximum acceleration of the container handling vehicle 201, 301, and a maximum linear momentum of the container handling vehicle 201, 301.

The central operational controller 501 instructs the container handling vehicle 201, 301 to follow a path 402, 403 on the rail system 108. The central operation controller 501 may receive data from the control system 500 related to columns on the rail system 108 that requires a container handling vehicle 201, 301 to pick up a storage bin, and to columns where the storage bin should be dropped off. The central operational controller 501 may instruct the container handling vehicle to follow the path 402, 403 by step-by-step instructions. The central operational controller 501 may instruct the container handling vehicle 201, 301 to follow a path 402, 403 which takes in at least a part of the subsection 401a, 401b. Furthermore, the central operational controller 501 instructs the container handling vehicle 201, 301 to reduce speed and/or acceleration such that the movement of the container handling vehicle within the subsection 401a, 401b is below the container handling vehicle movement threshold of the subsection 401a, 401b. While instructing the container handling vehicle to follow a path and instructing the container handling vehicle to reduce speed and/or acceleration is described in separate steps, both instructions may be part of a joint step-by-step instruction from the central operational controller to the container handling vehicle. In one embodiment, some of the steps may be performed by the local controller in each container handling vehicle 201, 301 under the control of the central operational controller 501. In one example, the container handling vehicle movement threshold of the subsection 401a, 401b may be transmitted to and stored in the local controller. The local controller of the container handling vehicle 201, 301 may then make the determination to reduce speed and/or acceleration on its own behalf.

The central operational controller 501 having knowledge of the path 402, 403 of the container handling vehicle may instruct the container handling vehicle 201, 301 prior to the container handling entering the subsection 401a, 401b, such that the container vehicle 201, 301 has reduced the speed prior to entering the subsection. The central operational controller 501 having knowledge of the container handling vehicle 201, 301 may also predict the latest point in time when the instructions needs to be effectuated in order for the container handling vehicle to have reduced its speed below the vehicle movement threshold at the time a side of the container handling vehicle crosses a border of the subsection 401a, 401b.

In another embodiment, the central operational controller 501 having knowledge of the path 402, 403 of the container handling vehicle 201, 301 may instruct the container handling vehicle 201, 301 to reduce the speed and/or acceleration below the vehicle movement threshold once a side of the container handling vehicle 201, 301 crosses a border of the subsection 401a, 401b. Instructions to the container handling vehicle 201, 301 to reduce speed and/or acceleration may be part of the instructions to the container handling vehicle 201, 301 to follow the path 402, 403.

When the container handling vehicle 201, 301 is leaving the subsection 401a, 401b, the central operation controller instructs the container handling vehicle 201, 301 to revert to a default speed and/or acceleration. The default speed and/or acceleration would typically be the maximum speed and/or acceleration of the container handling device 201, 301. The instructions to the container handling vehicle 201, 301 to revert to a default speed and/or acceleration may be part of the instructions to the container handling vehicle 201, 301 to follow the path 402, 403. The point in time when the container handling vehicle 201, 301 is leaving the subsection 401a, 401b may depend on the specific requirements of the system. However, one suitable point in time may be when a first side of the container handling vehicle 201, 301 crosses a border of the subsection 401a, 401b on its way out of the subsection 401a, 401b. Another suitable point in time may be when the container handling vehicle 201, 301 has completely left the subsection 401a, 401b.

In some instances, for example when movement of the container handling vehicle 201, 301 outside the subsection 401a, 401b is below the container handling movement threshold of the subsection 401a, 401b, the instruction to the container handling vehicle 201, 301 is redundant. In an automated storage and retrieval systems 1 having many container handling vehicles 201, 301 redundant messages may cause an unwanted additional load on the communication channels. With additional reference to FIG. 6 illustrating one embodiment of the invention, the central operational controller 501 is further adapted to, prior to instructing the container handling vehicle 201, 301 to reduce speed and/or acceleration, determining that a current movement of the container handling vehicle exceeds the container handling vehicle movement threshold of the subsection 401a, 401b. The central operation controller 501 may then only instruct to reduce speed and/or acceleration when the current movement of the container handling vehicle exceeds the container handling vehicle movement threshold of the subsection 401a, 401b.

Determining that a current movement of the container handling vehicle exceeds the container handling vehicle movement threshold of the subsection 401a, 401b, may also be directional for the vehicles themselves, for example, due to a non-symmetry in the container handling vehicle 201, 301 and its engagement with the rail system 108. E.g., the container handling vehicle 201 might have different length to width thresholds due to asymmetry in the internal arrangement of the components and the resultant asymmetric weight distribution and wheelbase. The container handling vehicle 301 are usually arranged as left or right-handed cantilevers. The asymmetry in handling will depend on the load being carried in the container and the balance with respect to the motor weight.

In one embodiment, determining that the container handling vehicle exceeds the container handling vehicle movement may be based on classifying the container handling vehicle 201, 301 according to a container handling vehicle classification. The container handling vehicle classification may be different types of container handling vehicles, such as cantilever type 301 or cavity type 201, or versions of the same type of container handling vehicles having different specifications, such as different electric motors, different weights, different wheels etc. The container handling vehicle classification comprises a default speed and/or acceleration of the container handling vehicle, e.g. a measured average maximum speed and/or acceleration, or an expected maximum speed and/or acceleration based on the specifications of the container handling vehicles in the classification. The determination that the container handling vehicle exceeds the container vehicle movement threshold in the subsection 401a, 401b, is then simply based on determining the container handling vehicle classification.

In one embodiment, the central operation controller 501 may additionally receive data of the weight of a storage container transported by the container handling vehicle. The central operation controller 501 may receive the weight from weight sensors in the container handling vehicle or get information about the weight from the control system 500 that has knowledge about the content of the storage container. Determining that that the container handling vehicle exceeds the container handling vehicle movement threshold may then be based on the combined knowledge of the weight of the storage container and the container handling classification. Weight in a storage container may for example affect the handling of a cantilever type container handling device in larger degree than a cavity type container handling device.

In one embodiment, the central operation controller 501 may receive historical movement data of the container handling vehicle 201, 301 and determining that the container handling vehicle 201, 301 exceeds the container handling vehicle movement threshold based on the historical movement data. The determination may for example based on that the historical movement data show instability in the vehicle. Other historical movement data may include a number of derailings, a number of navigational errors, such as missed detections of rail crossings, etc.

FIG. 4 shows two different container handling vehicles 201, 301 instructed to follow paths 402 and 403, respectively. The central operational controller 501 have knowledge of footprints of the container handling vehicles on the rail system 108. The exemplary container handling vehicles 201, 301 illustrates exemplary sizes and footprints of container handling vehicles that may be put on the rail system 108.

The container handling vehicle 201 shown in FIG. 4 may have a footprint which is generally equal to the lateral extent of one storage column 105. The container handling vehicle 201 is instructed to follow a path 402 that crosses subsection 401*a*. As discussed above, the central operational controller 501 has knowledge of the path 402 and that the path crosses subsection 401*a*, and instructs the container handling vehicle 201 to reduce speed and/or acceleration such that the movement of the container handling vehicle 201 within subsection 401*a* is below the container handling vehicle movement threshold of the subsection 401*a*. The instructions may in one example be effectuated when the first long side of the footprint of the container handling vehicle 201 crosses the perimeter of the subsection 401*a*. When the container handling vehicle 201 leaves the subsection 401*a*, the central operation controller instructs 501 the container handling vehicle 201 to revert to the default speed and/or acceleration and continue to follow the path 402. In some embodiments, if the central operation controller 501 determine that the container handling vehicle 201 does not exceeds the container handling vehicle movement threshold of the subsection 401*a* both instructions are redundant and none of them are sent to the container handling vehicle 201. When the container handling vehicle is about to enter the next subsection 401*b*, the instructions to reduce speed and/or acceleration may in one example be effectuated when the first short side of the footprint of the container handling vehicle 201 crosses the perimeter of the next subsection 401*b*.

The container handling vehicle 301 shown in FIG. 4 has a cantilever construction and may have a footprint approximately the lateral extent of two storage columns 105. The container handling vehicle 301 is instructed to follow a path 403 that takes in subsection 401*b*. As discussed above, the central operational controller 501 has knowledge of the path 403 and that the path takes in subsection 401*b*, and instructs the container handling vehicle 301 to reduce speed and/or acceleration such that the movement of the container handling vehicle 301 within the subsection 401*b* is below the container handling vehicle movement threshold of the subsection 401*b*. The instructions may in one example be effectuated when the first short side of the footprint of the container handling vehicle 301 crosses the perimeter of the subsection 401*b*. In another example, when the container handling vehicle 301 enters the subsection 401*b* with the cantilever first, the instructions may be effectuated when the first wheels following the cantilever crosses the perimeter of the subsection 401*b*. When the container handling vehicle 301 leaves the subsection 401*b*, the central operation controller instructs 501 the container handling vehicle 301 to revert to the default speed and/or acceleration and continue to follow the path 403. In this illustrated example, the instructions to revert to default speed and/or acceleration may be effectuated when the first or second long side of the footprint of the container handling vehicle 301 crosses the perimeter of the subsection 401*b*. In some embodiments, if the central operation controller 501 determine that the container handling vehicle 301 does not exceeds the container handling vehicle movement threshold of the subsection 401*b* both instructions are redundant and none of them are sent to the container handling vehicle 301.

The higher likelihood for operational errors of the container handling vehicle 201, 301 in the subsections 401*a*, 401*b* may be due to mechanical differences in the rail system 108 and/or the framework structure 100 that leads to reduced mechanical stability of the subsection 401*a*, 401*b*, or a displacement of the rail system 108 in the subsection 401*a*, 401*b* in relation to the rail system 108 outside the subsection 401*a*, 401*b*. The reduced mechanical stability and displacement of the rail system may stem from a floor not according to specifications, erroneous mounting of the framework structure, damages on framework structure, displacement of framework structure, a building that has moved etc.

Determining the container handling vehicle movement threshold for the subsection 401*a*, 401*b* may be based on reduced mechanical stability in the subsection 401*a*, 401*b* of the of rail system 108 compared to a mechanical stability of the rail system 108 outside the subsection 401*a*, 401*b*.

The higher likelihood for operational errors of the container handling vehicle 201, 301 in the subsections 401*a*, 401*b* may also be due to reduced friction in the subsection 401*a*, 401*b* compared to a friction of the rail system 108 outside the subsection 401*a*, 401*b*, for example based on detection of oil, water, grease etc. on the rail system 108.

Determining the container handling vehicle movement threshold for the subsection 401*a*, 401*b* may be based on a displacement of the of rail system 108 in the subsection 401*a*, 401*b* in relation to the rail system 108 outside the subsection 401*a*, 401*b*.

The higher likelihood for operational errors of the container handling vehicle 201, 301 in the subsections 401*a*, 401*b* may also be due to a difference in environmental conditions in the subsection 401*a*, 401*b*, such as difference in temperature, air pressure, humidity, ambient gasses etc. Changes in environmental conditions may change the performance of the container handling vehicle 201, 301. In one example, water may condense on the wheels of a container handling vehicle 201, 301 entering a cold zone from a warmer and more humid zone, which may cause reduced friction. In another example, the efficiency of the motor may change such that the speed of the container handling vehicle increases.

Determining the container handling vehicle movement threshold for the subsection 401a, 401b may be based on a reduced friction in the subsection 401a, 401b of the rail system 108 compared to a friction of the rail system 108 outside the subsection 401a, 401b.

The container handling vehicle movement threshold for the subsection 401a, 401b may be different in the first direction X and the second direction Y. The rails are closer together in the first direction X, that may make the structure stronger or more rigid than for the wider spacing between the junction points in the second direction Y.

The higher likelihood for operational errors of the container handling vehicle 201, 301 in the subsections 401a, 401b may be determined by physical and/or visual inspection of the rail system 108 and the framework structure 100. The physical and/or visual inspection may be performed manually.

In one embodiment, the system comprises a rail inspection vehicle adapted to traverse the rail system 108. The system is adapted to determining, using the rail inspection vehicle, the container handling vehicle movement threshold for the subsection 401a, 401b of the rail system 108.

The rail inspection vehicle may be provided with gyros, accelerometers, or other suitable movement sensor to determine vertical and/or horizontal movement of the rail inspection vehicle due to movement in the rail system while traversing the rail system 108. The system may then determine the container handling vehicle movement threshold based on detected vertical and/or horizontal movement of the rail inspection vehicle due to movement in the rail system above a fault threshold.

In addition, or alternatively, the container handling vehicle movement threshold may be determined by the system based on detected changes in horizontal movement of the rail inspection vehicle due to a change in a condition of the rail system.

The rail inspection vehicle may be provided with an imaging device, such as a camera, in any suitable range of the electromagnetic spectrum, adapted to visually detect faults in the rail system while traversing the rail system 108. The system may then determine the container handling vehicle movement threshold based on visually detected faults in the rail system 108.

In the preceding description, various aspects of the container handling vehicle and the automated storage and retrieval system according to the invention have been described with reference to the illustrative embodiment. For purposes of explanation, specific numbers, systems and configurations were set forth in order to provide a thorough understanding of the system and its workings. However, this description is not intended to be construed in a limiting sense. Various modifications and variations of the illustrative embodiment, as well as other embodiments of the system, which are apparent to persons skilled in the art to which the disclosed subject matter pertains, are deemed to lie within the scope of the present invention.

LIST OF REFERENCE NUMBERS

Prior art (FIGS. 1-3):
1 Prior art automated storage and retrieval system
100 Framework structure
102 Upright members of framework structure
103 Horizontal members of framework structure 104 Storage grid
105 Storage column
106 Storage container
106' Particular position of storage container
107 Stack
108 Rail system
110 Parallel rails in first direction (X)
110a First rail in first direction (X)
110b Second rail in first direction (X)
111 Parallel rail in second direction (Y)
111a First rail of second direction (Y)
111b Second rail of second direction (Y)
112 Access opening
119 First port column
120 Second port column
201 Prior art storage container vehicle
201a Vehicle body of the storage container vehicle 201
201b Drive means/wheel arrangement, first direction (X)
201c Drive means/wheel arrangement, second direction (Y)
301 Prior art cantilever storage container vehicle
301a Vehicle body of the storage container vehicle 301
301b Drive means in first direction (X)
301c Drive means in second direction (Y)
304 Gripping device
500 Control system
X First direction
Y Second direction
Z Third direction
FIG. 4:
108 Rail system
201 Prior art storage container vehicle
301 Prior art cantilever storage container vehicle
401a Subsection of rail system
401b Subsection of rail system
402 Path for container vehicle 201
403 Path for container vehicle 301
500 Control system
501 Central operational controller
X First direction
Y Second direction
Z Third direction

The invention claimed is:

1. A method for controlling movement of a plurality of container handling vehicles on a rail system arranged at least partially across a top of a framework structure of an automated storage and retrieval system, on which rail system the plurality of container handling vehicles are operable to raise storage containers from, and lower storage containers into, storage columns arranged in rows between upright members and horizontal members of the framework structure, and also to transport the storage containers above the storage columns, and where the following steps are performed by a central operational controller which is in communication with a local controller in each container handling vehicle:

receiving data relating to a subsection of the rail system, the data comprising a container handling vehicle movement threshold for the subsection;

instructing a container handling vehicle to follow a path which takes in at least a part of the subsection;

instructing the container handling vehicle to reduce speed and/or acceleration such that the movement of the container handling vehicle within the subsection is below the container handling vehicle movement threshold of the subsection.

2. The method of claim 1, wherein the method further comprises instructing the container handling vehicle to revert to a default speed or a default acceleration when the container handling vehicle is leaving or about to leave the subsection.

3. The method of claim 1, wherein the container handling vehicle movement threshold sets a maximum speed of the container handling vehicle.

4. The method of claim 1, wherein the container handling vehicle movement threshold sets a maximum acceleration of the container handling vehicle.

5. The method of claim 1, wherein the container handling vehicle movement threshold sets a maximum linear momentum of the container handling vehicle.

6. The method of claim 1, wherein the container handling vehicle movement threshold is determined based on visually detected faults in the rail system.

7. The method of claim 1, wherein the method further comprises determining the container handling vehicle movement threshold for the subsection based on a reduced mechanical stability in the subsection of the rail system compared to a mechanical stability of the rail system outside the subsection.

8. The method of any of claim 1, wherein the method further comprises determining the container handling vehicle movement threshold for the subsection based on a displacement of the rail system in the subsection in relation to the rail system outside the subsection.

9. The method of claim 1, wherein the method further comprises determining the container handling vehicle movement threshold for the subsection based on a reduced friction in the subsection of the rail system compared to a friction of the rail system outside the subsection.

10. The method of claim 1, wherein the method further comprises determining the container handling vehicle movement threshold for the subsection based on different environmental conditions in the subsection of the rail system than in the rail system outside the subsection.

11. The method of claim 1, wherein the method further comprises:

transmitting the container handling vehicle movement threshold for the subsection to the local controller in the container handling vehicle, and performing, using the local controller in the container handling vehicle, instructing the container handling vehicle to reduce speed and/or acceleration such that the movement of the container handling vehicle within the subsection is below the container handling vehicle movement threshold of the subsection.

12. The method of claim 1, wherein the method further comprises determining, using a rail inspection vehicle traversing the rail system, the container handling vehicle movement threshold for the subsection of the rail system.

13. The method of claim 12, wherein the container handling vehicle movement threshold is determined based on either:

detected vertical or horizontal movement of the rail inspection vehicle due to movement in the rail system above a fault threshold; or detected changes in horizontal movement of the rail inspection vehicle due to a change in a condition of the rail system.

14. The method of claim 1, wherein the method further comprises, prior to the step of instructing the container handling vehicle to reduce speed and/or acceleration, a step of determining that a current movement of the container handling vehicle exceeds the container handling vehicle movement threshold of the subsection.

15. The method of claim 14, wherein the step of determining that the container handling vehicle exceeds the container handling vehicle movement threshold further comprises:

receiving historical movement data of the container handling vehicle, and determining, based on the historical movement data of the container handling vehicle, that the container handling vehicle exceeds the container handling vehicle movement threshold.

16. The method of claim 14, wherein the step of determining that the container handling vehicle exceeds the container handling vehicle movement threshold further comprises:

classifying the container handling vehicle according to a container handling vehicle classification, the container handling vehicle classification comprising a default speed or a default acceleration of the container handling vehicle; and determining, based on the container handling vehicle classification, that the container handling vehicle exceeds the container handling vehicle movement threshold.

17. The method of claim 16, wherein the step of determining that the container handling vehicle exceeds the container handling vehicle movement threshold further comprises:

receiving data of a weight of a storage container transported by the container handling vehicle; and determining, based on the weight of the storage container and the container handling classification, that the container handling vehicle exceeds the container handling vehicle movement threshold.

18. A system comprising:

a rail system arranged at least partially across a top of a framework structure of an automated storage and retrieval system;

a plurality of container handling vehicles operating on the rail system to raise storage containers from, and lower storage containers into, storage columns arranged in rows between upright members and horizontal members of the framework structure, and also to transport the storage containers above the storage columns, each container handling vehicle comprising a local controller adapted to control movements of the container handling vehicle; and a central operational controller in communication with the local controller in each container handling vehicle, the central operational controller being adapted to perform:

receiving data relating to a subsection of the rail system, the data comprising a container handling vehicle movement threshold for the subsection;

instructing a container handling vehicle to follow a path which takes in at least a part of the subsection; and instructing the container handling vehicle to reduce speed and/or acceleration such that the movement of the container handling vehicle within the subsection is below the container handling vehicle movement threshold of the subsection.

19. The system of claim 18, wherein the central operational controller is further adapted to instructing the container handling vehicle to revert to a default speed or default acceleration when the container handling vehicle is leaving or about to leave the subsection.

20. The system of claim 18, wherein the container handling vehicle movement threshold sets a maximum speed of the container handling vehicle.

21. The system of claim 18, wherein the container handling vehicle movement threshold sets a maximum acceleration of the container handling vehicle.

22. The system of claim 18, wherein the container handling vehicle movement threshold sets a maximum linear momentum of the container handling vehicle.

23. The system of claim 18, wherein the container handling vehicle movement threshold is determined based on visually detected faults in the rail system.

24. The system of claim 18, wherein the container handling vehicle movement threshold for the subsection is determined based on a reduced mechanical stability in the subsection of the rail system compared to a mechanical stability of the rail system outside the subsection.

25. The system of claim 18, wherein the container handling vehicle movement threshold for the subsection is determined based on a displacement of the rail system in the subsection in relation to the rail system outside the subsection.

26. The system of claim 18, wherein the container handling vehicle movement threshold for the subsection is determined based on a reduced friction in the subsection of the rail system compared to a friction of the rail system outside the subsection.

27. The system of claim 18, wherein the container handling vehicle movement threshold for the subsection is determined based on different environmental conditions in the subsection of the rail system than in the rail system outside the subsection.

28. The system of claim 18, wherein central operational controller is further adapted to transmitting the container handling vehicle movement threshold for the subsection to the local controller in the container handling vehicle, and the local controller in the container handling vehicle is further adapted to instructing the container handling vehicle to reduce speed and/or acceleration such that the movement of the container handling vehicle within the subsection is below the container handling vehicle movement threshold of the subsection.

29. The system of claim 18, wherein the system further comprises a rail inspection vehicle adapted to traverse the rail system, and is adapted to determining, using the rail inspection vehicle, the container handling vehicle movement threshold for the subsection of the rail system.

30. The system of claim 29, wherein the container handling vehicle movement threshold is determined based on either:

detected vertical or horizontal movement of the rail inspection vehicle due to movement in the rail system above a fault threshold; or detected changes in horizontal movement of the rail inspection vehicle due to a change in a condition of the rail system.

31. The system of claim 18, wherein the central operational controller is further adapted to, prior to instructing the container handling vehicle to reduce speed and/or acceleration, determining that a current movement of the container handling vehicle exceeds the container handling vehicle movement threshold of the subsection.

32. The system of claim 31, wherein determining that the container handling vehicle exceeds the container handling vehicle movement threshold further comprises:

receiving historical movement data of the container handling vehicle, and determining, based on the historical movement data of the container handling vehicle, that the container handling vehicle exceeds the container handling vehicle movement threshold.

33. The system of claim 31, wherein determining that the container handling vehicle exceeds the container handling vehicle movement threshold further comprises:

classifying the container handling vehicle according to a container handling vehicle classification, the container handling vehicle classification comprising a default speed or default acceleration of the container handling vehicle; and determining, based on the container handling vehicle classification, that the container handling vehicle exceeds the container handling vehicle movement threshold.

34. The system of claim 33, wherein determining that the container handling vehicle exceeds the container handling vehicle movement threshold further comprises:

receiving data of a weight of a storage container transported by the container handling vehicle; and determining, based on the weight of the storage container and the container handling classification, that the container handling vehicle exceeds the container handling vehicle movement threshold.

35. A computer program product for a central operational controller in a system comprising a plurality of container handling vehicles on a rail system arranged at least partially across a top of a framework structure of an automated storage and retrieval system, on which rail system the plurality of container handling vehicles are operable to raise storage containers from, and lower storage containers into, storage columns arranged in rows between upright members and horizontal members of the framework structure, and also to transport the storage containers above the storage columns, each container handling vehicle comprising a local controller adapted to control movements of the container handling vehicle, and the central operational controller is in communication with the local controller in each container handling vehicle, the computer program product comprises instructions that when executed on the central operational controller performs a method comprising:

receiving data relating to a subsection of the rail system, the data comprising a container handling vehicle movement threshold for the subsection;

instructing a container handling vehicle to follow a path which takes in at least a part of the subsection;

instructing the container handling vehicle to reduce speed and/or acceleration such that the movement of the container handling vehicle within the subsection is below the container handling vehicle movement threshold of the subsection.

\* \* \* \* \*